(12) United States Patent
Weldemariam et al.

(10) Patent No.: US 11,010,437 B2
(45) Date of Patent: May 18, 2021

(54) SOCIAL MEDIA CONTROL PROVISIONING BASED ON A TRUSTED NETWORK

(71) Applicant: International Business Machines Corporation, Armonk, NY (US)

(72) Inventors: Komminist Weldemariam, Nairobi (KE); Isaac Markus Serfaty, Nairobi (KE); Abdigani Diriye, Nairobi (KE); Shikhar Kwatra, Research Triangle Park, NC (US); Michael S. Gordon, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 340 days.

(21) Appl. No.: 16/172,735

(22) Filed: Oct. 27, 2018

(65) Prior Publication Data

US 2020/0134095 A1    Apr. 30, 2020

(51) Int. Cl.
| | |
|---|---|
| G06F 16/00 | (2019.01) |
| G06F 16/9535 | (2019.01) |
| G06Q 50/00 | (2012.01) |
| H04L 29/06 | (2006.01) |
| G06F 16/35 | (2019.01) |
| G06F 40/30 | (2020.01) |
| G06N 20/00 | (2019.01) |

(52) U.S. Cl.
CPC .......... *G06F 16/9535* (2019.01); *G06F 16/35* (2019.01); *G06F 40/30* (2020.01); *G06Q 50/01* (2013.01); *H04L 63/108* (2013.01); *G06N 20/00* (2019.01)

(58) Field of Classification Search
CPC ...... G06F 16/9535; G06F 16/35; G06F 40/30; G06Q 50/01; H04L 63/108; G06N 20/00
See application file for complete search history.

(56) References Cited

U.S. PATENT DOCUMENTS

| | | | | |
|---|---|---|---|---|
| 2013/0332545 | A1* | 12/2013 | Primus | H04L 51/12 709/206 |
| 2014/0156748 | A1* | 6/2014 | Allen | G06Q 50/01 709/204 |
| 2014/0289261 | A1* | 9/2014 | Shivakumar | G06Q 50/01 707/748 |

(Continued)

OTHER PUBLICATIONS

"Trust profiles for exposure of social media content", ip.com, Sep. 2, 2016 (Year: 2016).*

(Continued)

*Primary Examiner* — Jared M Bibbee
(74) *Attorney, Agent, or Firm* — Shimon Benjamin, Esq.; McGinn IP Law Group, PLLC

(57) ABSTRACT

A social media control method, system, and computer program product, include detecting a contextual meaning of a content of a third-party post on a user's social media account, classifying the content into user-defined categories based on an overlap between the contextual meaning and the user-defined categories, identifying an undesired piece of information from the content, identifying a trusted online friend within a social media circle of the user, and providing a one-time access control to the identified trusted online friend to rectify the undesired content in the third-party post.

18 Claims, 9 Drawing Sheets

(56) References Cited

U.S. PATENT DOCUMENTS

| | | | |
|---|---|---|---|
| 2015/0317562 A1* | 11/2015 | Srinivasan | G06N 20/10 |
| | | | 706/11 |
| 2016/0196561 A1* | 7/2016 | Iyer | G06Q 30/016 |
| | | | 705/304 |
| 2017/0374072 A1 | 12/2017 | Steinberg et al. | |
| 2018/0052756 A1 | 2/2018 | Krueger et al. | |

OTHER PUBLICATIONS

Mel, et al. "The NIST Definition of Cloud Computing". Recommendations of the National Institute of Standards and Technology. Nov. 16, 2015.

* cited by examiner

SOCIAL MEDIA CONTROL PROVISIONING BASED ON A TRUSTED NETWORK

BACKGROUND

The present invention relates generally to a social media control method, and more particularly, but not by way of limitation, to a system, method, and recording medium for providing an editing mechanism to user's friends to correct posted social media content of the user when the user is not present online based on a dynamically computed trust score and content undesirability.

Social networks help people to stay connected with the each other and the external world. Once any content is shared, then friends of the social network user can view the contents, can provide comments, can provide reactions etc.

Efforts are made to restrict posting of potentially objectionable content to members of sensitive or protected cohorts, for example, blocking the posting of such content, presenting the poster to review the content before posting the content, etc. However, conventional techniques mainly focus on analyzing the content of the post with respect to user cohorts and providing suggestions to the poster in order to correct the post.

Thus, there is a need in the art to create an automated technique to take control at the appropriate time and provide a one-time access control to one or a subset of friends after alerting them about any possibly unintentionally posted content by their friends.

SUMMARY

In an exemplary embodiment, the present invention can provide a computer-implemented social media control method, the method including detecting a contextual meaning of a content of a third-party post on a user's social media account, classifying the content into user defined categories based on an overlap between the contextual meaning and the user defined categories, identifying an undesired piece of information from the content, identifying a trusted online friend within a social media circle of the user, and provisioning a one-time access control to the identified trusted online friend to edit and rectify the undesired content in the third-party post.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which FIG. 1 exemplarily shows a high-level flow chart for a social media control method 100.

DETAILED DESCRIPTION

Figure 1:
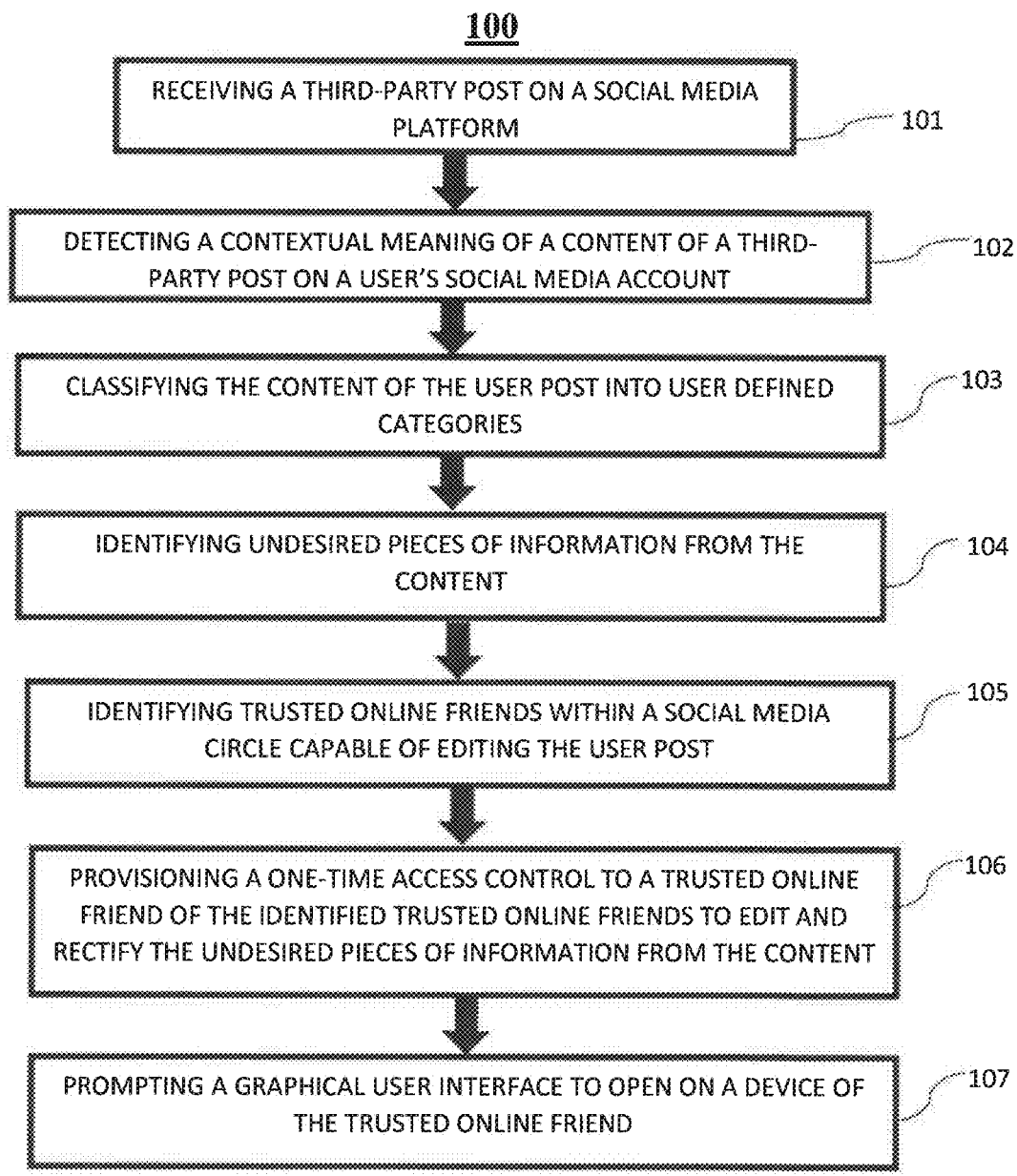

The invention will now be described with reference to FIG. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the social media control method 100 includes various steps to provision a one-time access control to identified trusted friends to edit and rectify any undesired content posted on a social media account. As shown in at least FIG. 7, one or more computers of a computer system 12 according to an embodiment of the present invention can include a memory 28 having instructions stored in a storage system to perform the steps of FIG. 1.

Thus, the social media control method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 7-9) may be implemented in a cloud environment 50 (see e.g., FIG. 8), it is nonetheless understood that the present invention can be implemented outside of the cloud environment.

With reference generally to FIGS. 1-6, the invention provides an editing mechanism to friends to correct posted social media content of a user when the user is not present online based on a dynamically computed trust score and content undesirability.

Editing of the content of a post in a social media network by one or more trusted users on user devices can include any of correcting words, rewriting a post, deleting a post (e.g., video, picture or image), etc.

In step 101, a third-party post is received on a social media platform. For example, a first user can post on a second user's social media platform. Alternatively, the post can include posts directly by the owner of the social media account (e.g., the user posts on their own social media platform). It is noted that the post can include a textual post (e.g., Twitter®, Facebook®, etc.), a photograph post (e.g., Instagram®, Snapchat®, etc.), a text message (e.g., iMessage®, SMS text), etc., an e-mail, etc.

In step 102, a contextual meaning of a content of the post is detected. This may be achieved by generating a co-occurrence matrix of terms in the post and using this as input for pre-trained models that output a probability of 0 to 1 of the content being offensive or undesired against either user identified categories and/or categories that are learned over a period of time deemed to be offensive or undesired. The invention may be configured with a social media network application that runs in the background to monitor a user post on a social media network. The detection can be triggered when a user is about to post a content or based on user-specified rules (e.g., a certain category of a post is about to be posted, e.g., when a mouse/finger is detected over the Post button). The content to be posted on the social media network is analyzed (e.g., using a natural language processing (NLP) module). By analyzing the content, the invention may identify an aspect of one or more editable portions of the content by determining the "undesirability" of the content to one or more viewers (Facebook® friends, Twitter® followers, etc.). The method of determining the "undesirability" aspects of the content is further correlated with analysis of each viewer profile, including analysis of their historical interactions or reactions to similar previous posts. Such a method may also develop/use weighting, thresholds, etc. based on historical interactions etc. or could be set by the user.

In step 103, the content of the user post is classified into pre-defined categories (e.g., politics, certain activities, science, religion, etc.).

In step 104, the undesired pieces of information are identified based on the content. In other words, the editable portion of the content is identified.

Figure 4:
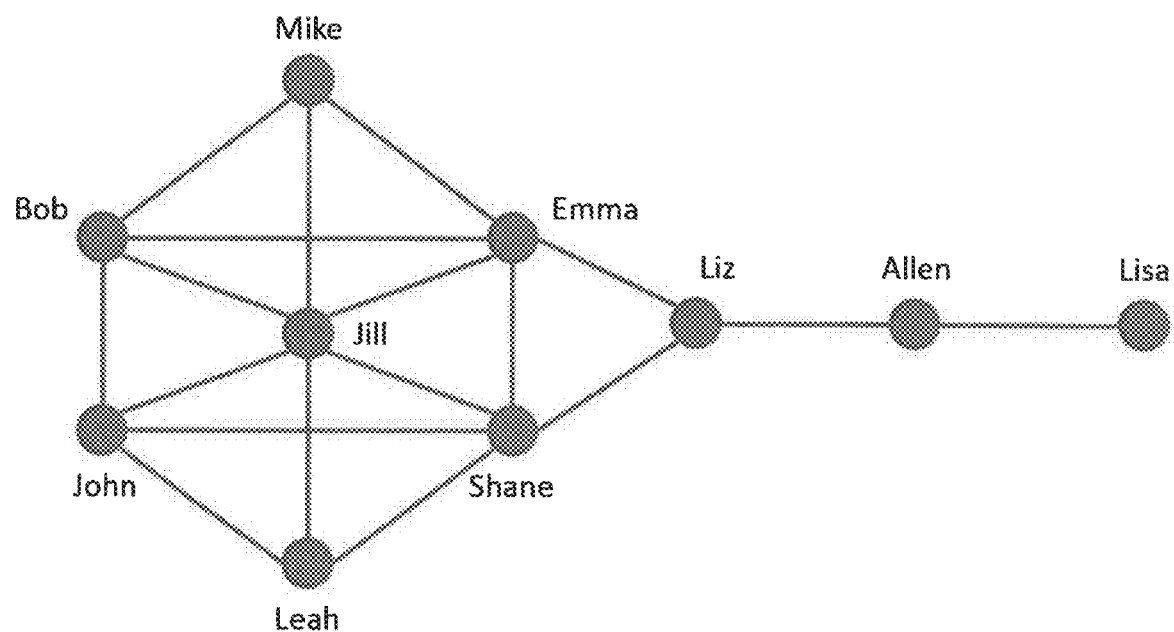
FIG. 4 exemplarily depicts a graph network for connections between online friends to identify trusted online friends according to an embodiment of the invention.

In step 105, trusted friends are identified within a social media circle that are capable of editing the post. In other words, if the user is offline or unavailable to edit posts on their social media, a trusted friend can step in and edit posts for them. A friend may be "trusted" based on their relationship to the user, past posts, communications therebetween, etc. The identification process for identifying trusted friends is achieved by generating a network graph as shown in FIG. 4. Direct and indirect relationships are identified via historical interactions and based on the types and number of interactions edges weighted. Users define trusted relationship by setting a minimum threshold that is correlated with the weighted edges.

In step 106, a one-time access control is provisioned to a trusted friend to edit and rectify the undesired pieces of information from the content. That is, the trusted friend is prompted to fix the undesirable post by, for example, deleting, editing, changing, etc. the post.

Figure 6:
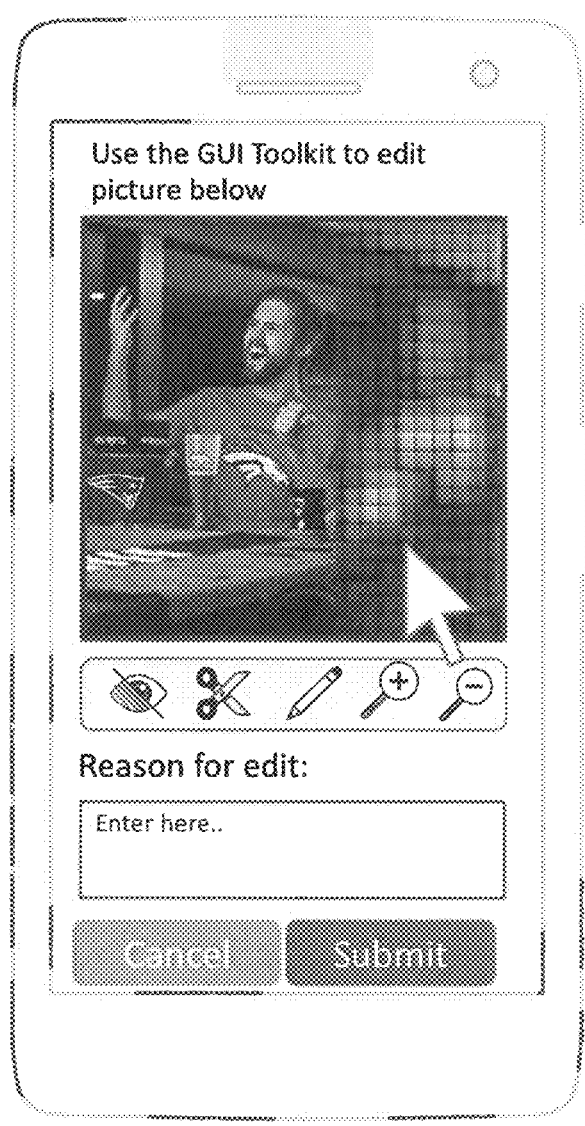
FIG. 6 exemplarily depicts a graphical user interface (GUI) on a trusted online friends device to edit a post according to an embodiment of the present invention.

In step 107, a graphic user interface (GUI), such as that shown in FIG. 6, is given to the trusted online friend on a device owned by the trusted friend (e.g., a notification on a mobile device which when accepted opens the GUI to allow the post to be edited).

Figure 5:
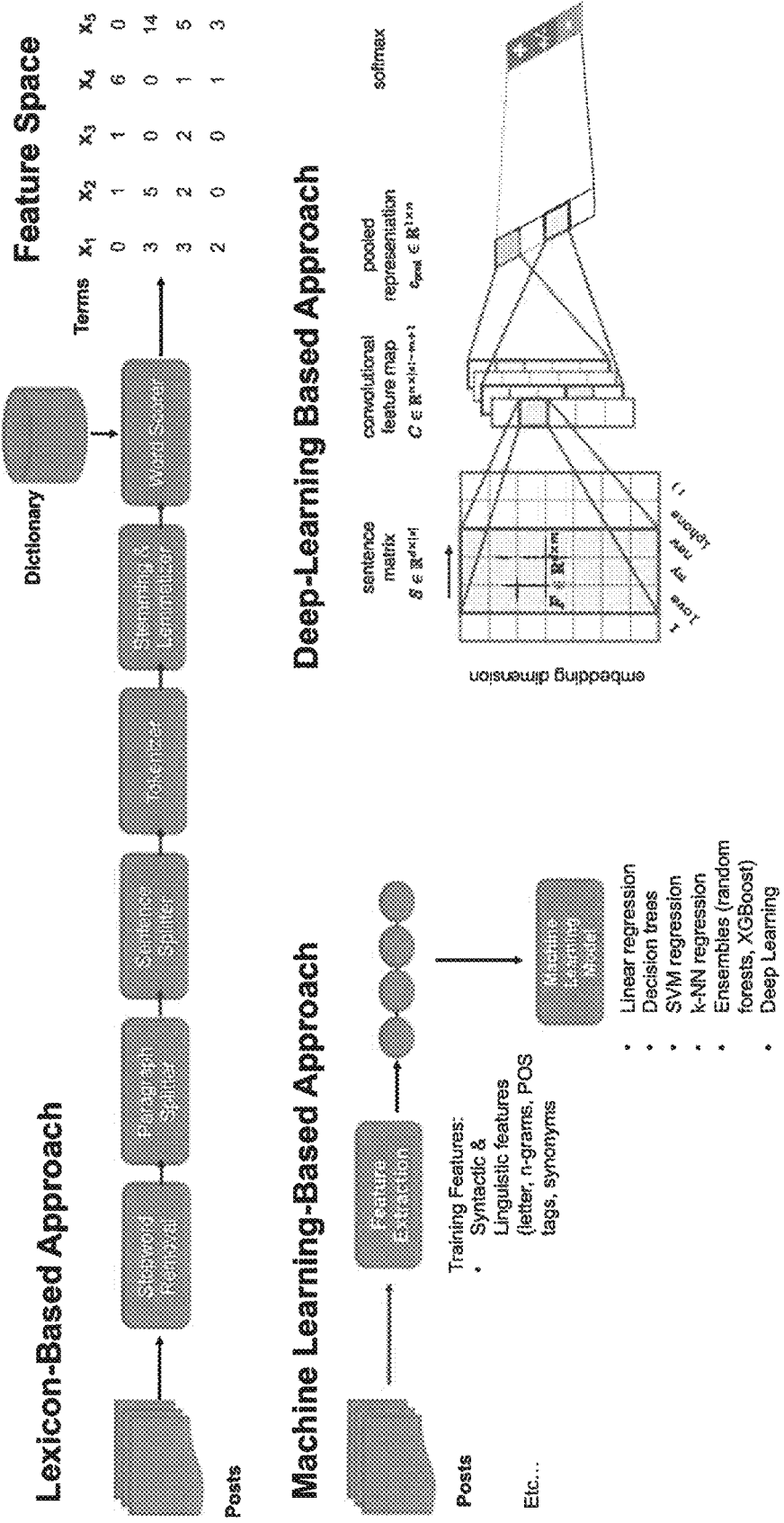
FIG. 5 exemplarily depicts a technique to detect an undesirable post according to an embodiment of the invention.

In one embodiment, with reference to FIG. 5, the detection of the portion of a content of a post that requires editing includes identifying the multimedia content. For example, the user may post a photo of a friend or group of friends on social media showing image(s) of a person who should be protected (e.g., a picture someone posts of themselves and friends doing an activity and the picture shows people other than themselves or their friends). Various text analysis techniques known in the art like text categorization, semantic similarity, sentiment analysis, etc., deep learning based methods for detecting multimedia content can be used to identify, detect and establish content undesirability with respect to the context of a post and the user group.

By way of an implementation example, a lexicon-based, machine learning and deep learning based approaches are shown in FIG. 5. The pipeline in each approach receives the post and outputs a tuple "S" comprising which portions of the post that should be editable and a post score ranging from −1 to 1 where a score less than 0 suggests negative or content that can be interpreted in a negative way or is offensive. Posts greater than 0 suggest posts that are appropriate and would not be undesired (e.g., posts that are acceptable). For example, a post about a wedding or a new child would receive a score >0, whereas an undesired post, for instance a post ranting about what someone said or a post with an image having a person not associated with the photo, could receive a negative value. This score is determined using the approaches as shown in FIG. 5 by either using a series of language processing steps (e.g., stopword removal, tokenization, stemming, etc.) and matching specific words to a dictionary of positive and negative scores which are summed, and a post score generated. In the machine and deep learning approaches, historic posts which have been labelled with specific labels and scored by humans and using linguistic and syntactic features are used to train and apply models (e.g. convolutional neural nets, linear regression, etc.).

In one embodiment, identifying the editable portion of the content (e.g., identifying the undesired piece) further includes analyzing the post content and characteristics based on the predicted reactions and/or interactions of each viewer of the posted content or the cohorts of predicted users who would react to the post. Furthermore, anomaly detection methods may be used, following identification of content sentiment, to verify and check the intent of the post against several anomaly detection algorithms such as subset scanning for measuring the departure from normal user behavior. Anomalous posts are marked as editable pending other system checks.

Once the editable portion of the posted content is identified, the provisioning of a temporal access control for enabling real-time editing of the editable portion of the content to one or more secondary users, who are determined dynamically based on both the content and computed trust scores is enabled. For example, suppose Mike posts on Twitter® some commentary about a movie he just saw. The invention determines that portions of the post might be offensive or undesired to his Twitter® followers. The system alerts both him, and Kommy, a friend and follower with high trust score about the portion in question (e.g., a trusted online friend). Either person can apply edits before the post is sent to the Twitter® server. In addition to letting a trusted party edit the content, of course, identified undesirable content can be corrected by the author, himself or automatically corrected.

The invention may then intelligently control the posted content on a social media network based on analyzed characteristics of predicted viewers of the posted content. Viewers to a post can be predicted based on the type of the post, where it is posted, etc. This will help to minimize, reduce or eliminate possible damages or risks to the poster that can be caused by the posted content inappropriateness. In another embodiment, such posted content controls are implemented based on dynamically computed trust scores and editing capability matrix for each user in the friend's circle. That is, the capability matrix for each use include Knowledge on the pre/posted topic, skills, education, previous editing on other (similar) posts, etc. Another aspect of the invention is to implement such content controls based on a user-selective or specified group of editors on selected categories of posts or content of posts.

In another embodiment, the editing of content of a post includes editing multimedia content. For example, the user may post a photo of a friend or group of friends on social media where the post may contain image(s) of a person who should be protected (e.g., a picture someone posts of themselves and friends drinking in a bar and the picture shows people other than themselves or their friends.). In this scenario, the invention may dynamically provision to one or more trusted users an editing access control. The invention may provide a customizable GUI toolkit for the one or more trusted users to edit one or more pictures (e.g., to blur an image, crop an image, etc.) such as shown in FIG. 6 while the system runs a background machine learning model to ensure the user identity cannot be inferred from edited or modified image. In a related embodiment, the trusted users can edit audio files too as these can contain unwanted voices. For instance, consider a recorded audio interview with a celebrity and a fan shouts an obscenity that is recorded.

Given a pre-post, friends and contacts in a user's network can use a GUI to tag/label undesired posts, notify the user of the questionable content and decide on the next steps to take. This varies based on given access control. The customizable GUI toolkit provides various options to the selected one or more trusted users. By way of example, a user on Twitter® notified a friend that the pre-post they submitted is inappropriate and they should consider removing or editing it. The trusted user has the option of also providing an amendment to the text. The invention dynamically generates and provides different set of options to the user based on their access level and trust score.

In another example, in FIG. 6, a set of GUI elements are provided to the selected one or more trusted users for editing one or more pictures such as the capability to blur, crop, etc. while the invention runs a machine learning model in the background to preserve privacy. In this way, people's identity other than those intended to be in a photograph can be excluded from view. Or, the user can be filtered from the photograph to protect the user's identity.

The method 100 identifies trusted online friends within the user social media circle capable of editing the post. The method of identifying trusted online friends within the user social media circle capable of editing the post comprising of identifying the types of friends on the historical post based on analysis and profiling of the reactions, comments, likes etc. While posting any new content on a social network site, appropriate access is provided to a group or subset of trusted friends, as described later, and they can select one or more combination of access rights based on how different friends have reacted, responded, and asked questions to previous similar posts/threads. Accordingly, appropriate friends will get access to the newly posted social network content. The primary user who is posting the content can select what group or groups of friends can get access to the post based on their previous behavior with similar content.

Examples of behavior classes include those people who have appreciated the previous post, those who have congratulated and commented positive content to the previous post, those who have shown interest and asked questions about the previous post, those who have liked the previous post, those who have criticized the content of the previous post using emotional/sentiment analysis, those who have informed the user about modifying the content, etc.

Step 105 selects editing users by further analyzing the ability of each user to edit the identified piece of post content by determining a user's knowledge on the posted topic, skills, education, previous editing on other (similar) posts, etc. It is noted that the user social media profile may include the details of the user capabilities. The user historical data across multiple social media networks or apps (including user posts, discussions, profile data including previous experience, job history, education history, previous mentorships, and other data may be further analyzed.

For example, if the user posts some information which can be categorized under a specific topic, related to politics, science, or some personal family trip (including unintended typos for someone's names), then the context of the said information can be tagged under a specific topic with a specific level of sensitivity threshold. As an example, the threshold can vary from 0 to 5, with 5 meaning it can have the worst effect amongst the social media friends in that portal or communication medium in a negative form. The same information about a user's reactions is based on previous pattern history as learnt and stored in the information engine mentioned above. The underlying method for connecting and finding suitable friends depends on dynamic graph theory. FIG. 4 shows a sample network graph for representing network connections. The edges and nodes of the graph can evolve with time and be made to be dependent on the set of features determined as important for invention functionality.

In one embodiment, the trusted friend-matching algorithm further considers user content post as it relates to trusted friends. The sorting and ranking will remove trusted friends from consideration if the post content is ranked as offensive to them. In this scenario, the invention leverages the behavior classes determined to provide extra protection from posting offensive content to trusted friends.

Figure 3:
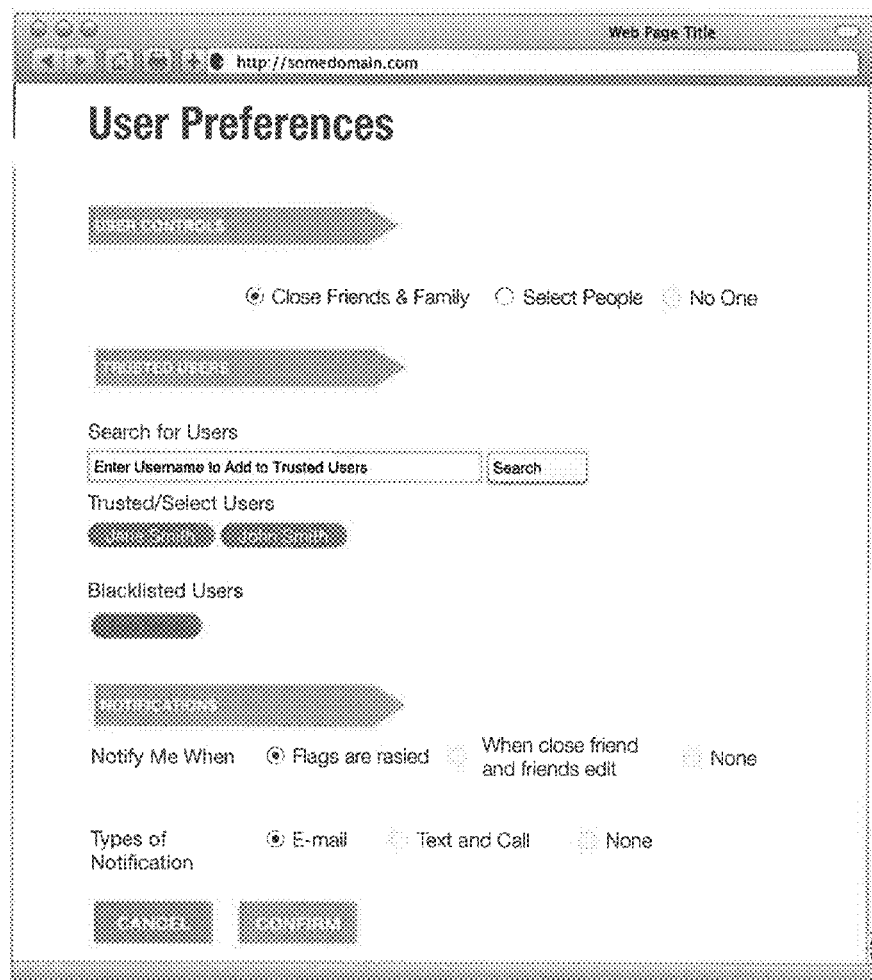
FIG. 3 exemplarily shows a user preference interface to edit a trusted online friend according to an embodiment of the present invention.

In one or more embodiments, the provisioning editing access control to trusted users (e.g., step 106) highlights the content that need editing on an interactive graphical user interface (e.g., step 107) of a user mobile device GUI for manually specifying, selecting or granting control to one or more friends on selected categories of posts access is provided (FIG. 3). The user may wish to provide the level of automated recommendations they wish to receive from the invention.

In one embodiment, using pattern analysis techniques of multiple historical posts are identified similar to the content that is "to be posted", the poster may be given the option to select one or more historical posts, and accordingly, aggregated reactions, comments, responses, etc. based possible friend group may be shown to the poster for providing one time edit access to the "to be posted" contents. The method 100 may gradually learn user's reactions and responses to certain undesired content as shown in FIG. 3 and check their actions (like reporting, deleting or commenting in a negative manner to the posted content). Based on unsupervised learning technique as described in a contextual analysis engine, this method automates certain social media tasks like deleting or editing comments or providing time-based access to certain friends capable of editing the post.

The method 100 can provide feedback to the user regarding the context that triggered an editing event. The report links data sources used in the training as well as explanation comments from trusted friend. For example, this feature can be utilized by young authors who might not know that certain section of their posts could be offensive to some audiences.

Figure 2:
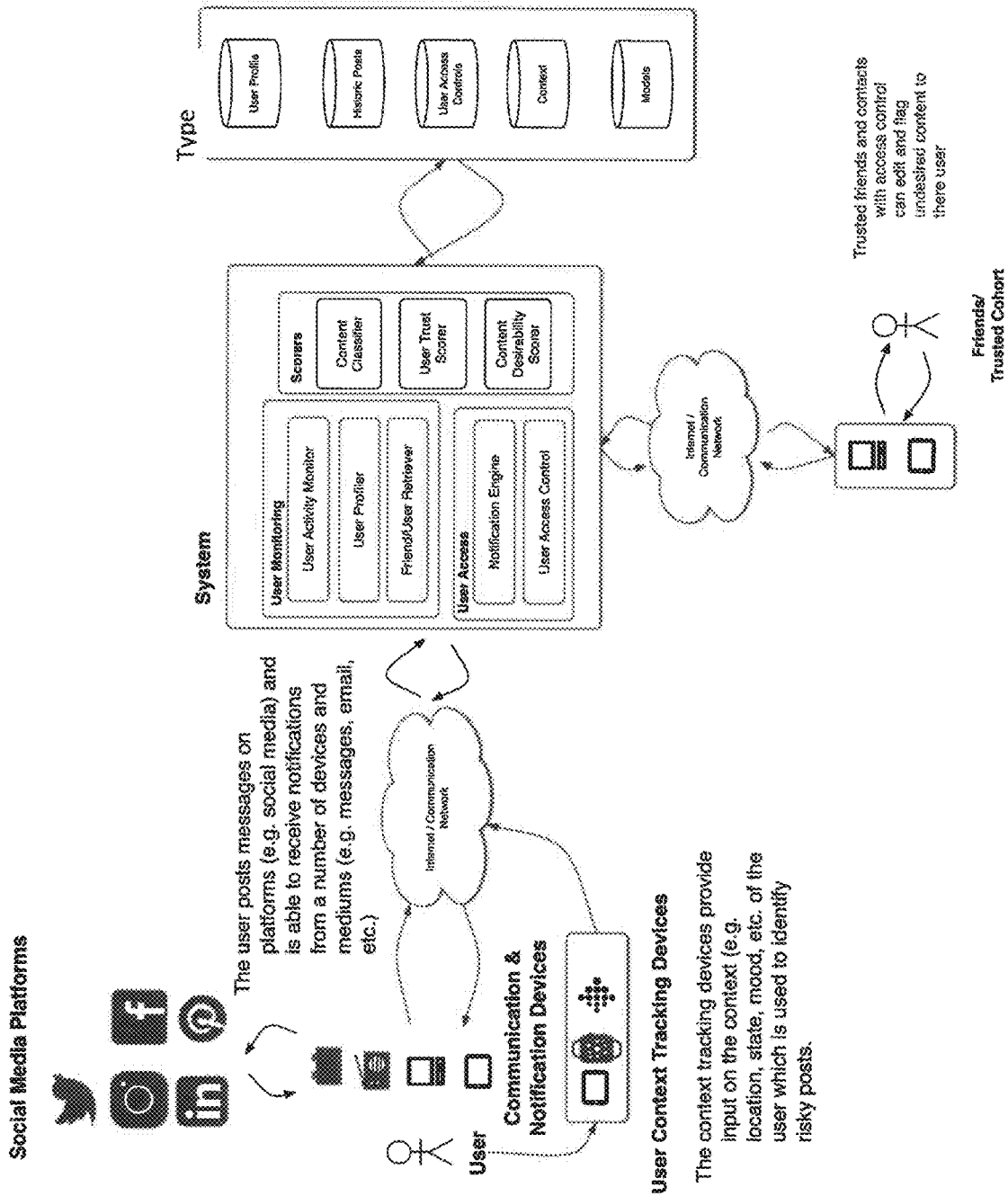
FIG. 2 exemplarily depicts a system architecture for implementing the method 100 according to an embodiment of the present invention.

FIG. 2 exemplary shows a system architecture for implementing the method 100. A user using a communication device can post a message on some content platform (e.g. Facebook®, Twitter®, etc.), and this message is passed onto the method 100 where additional data sources such as smart Watches®, Fitbits®, etc. are used to understand the context and the cognitive state of the user. These data are relayed to the methods, monitoring and scoring engines where the user profile and desirability of the content is determined. Based on historic posts and the user's profile, notifications are sent to trusted friends/users and the posting user. For example, in instances where the user has posted content late at night or in cognitive states where they seem tired or agitated/upset based on their hear rate, perspiration, etc. the system takes these features into the content desirability scorer and dynamically determines the appropriate prompts or trusted user cohorts or friends to notify.

The posting user can set the access level of certain users and depending on this setting the trusted users can edit or notify the posting user. Depending on the severity of the warning or the editing made, the method 100 dynamically routes this message to the posting user. For example, a trusted user tags a post as having a high level of undesirability because of the nature of an image or text. Because of the high undesirability score, the method routes this message to the user's cell phone and they receive a SMS or call letting them know they need to attend to this immediately. In other instances, they can take down this post until the posting user reviews it.

It is noted that the invention flags a post that may include undesirable before the post is posted and does not allow the post to be posted until after a trusted friend reviews the post. That is, the post is held in a "pre-post" stage until the post is modified to remove the undesirable content such that the post is not public.

And, after-post, the poster may not know he/she has posted inappropriate of unwanted piece of information and the poster is can't be found online or inattentive. The post may contain inappropriate or unwanted piece of info (e.g., misspelling) to a group of people on the social media. However, the inappropriateness of unwantedness of the piece of the post may not be established during pre-post, but can be revealed based on some friends reactions after the post is gone to public (this is a very natural process).

Thereby, the method 100 can allow an extra safeguard to mitigate undesired and potentially harmful posts to social media by granting a one-time access to a trusted online friend to edit a post to remove the undesired content.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
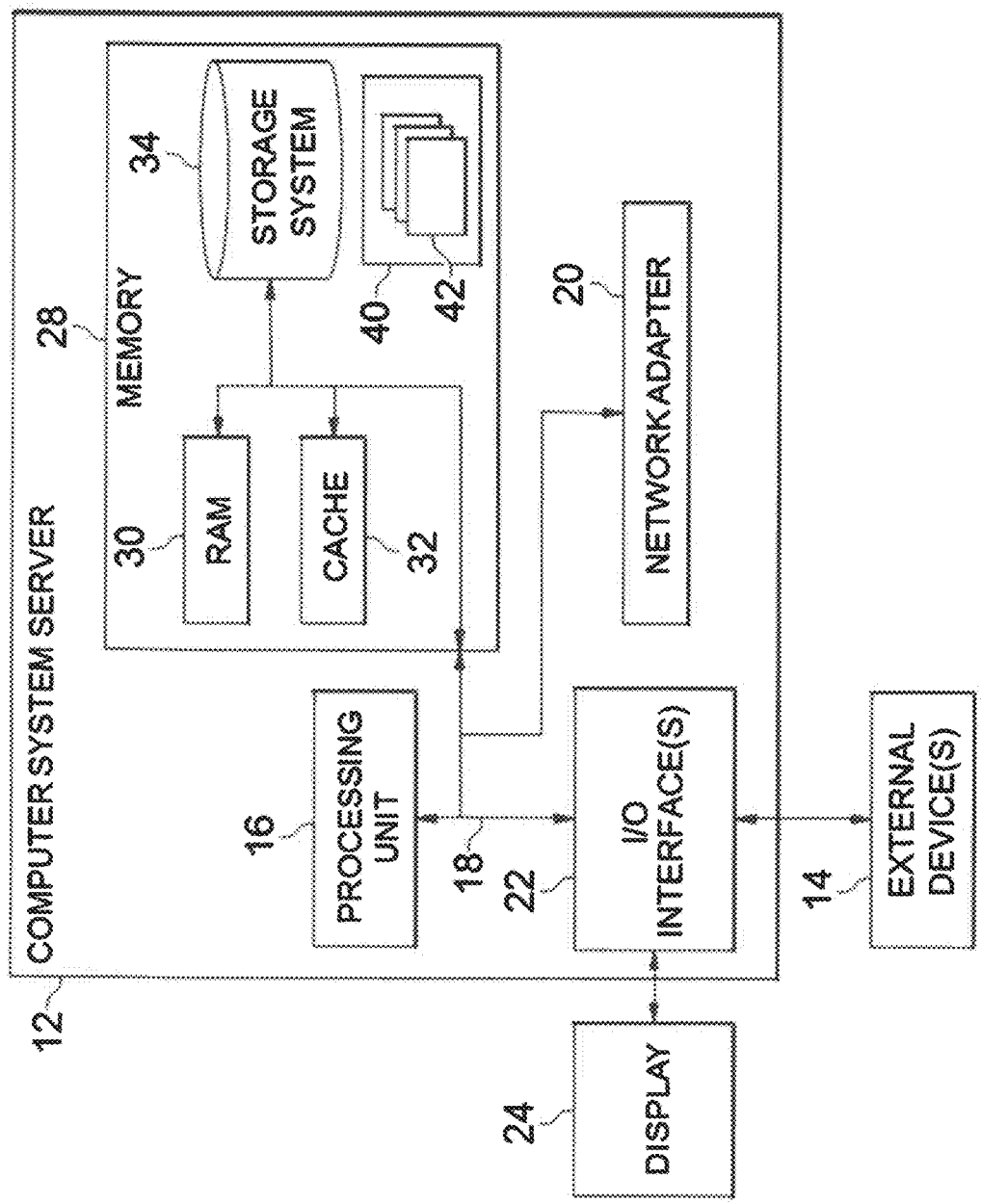
FIG. 7 depicts a cloud computing node 10 according to an embodiment of the present invention.

Referring now to FIG. 7, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 7, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
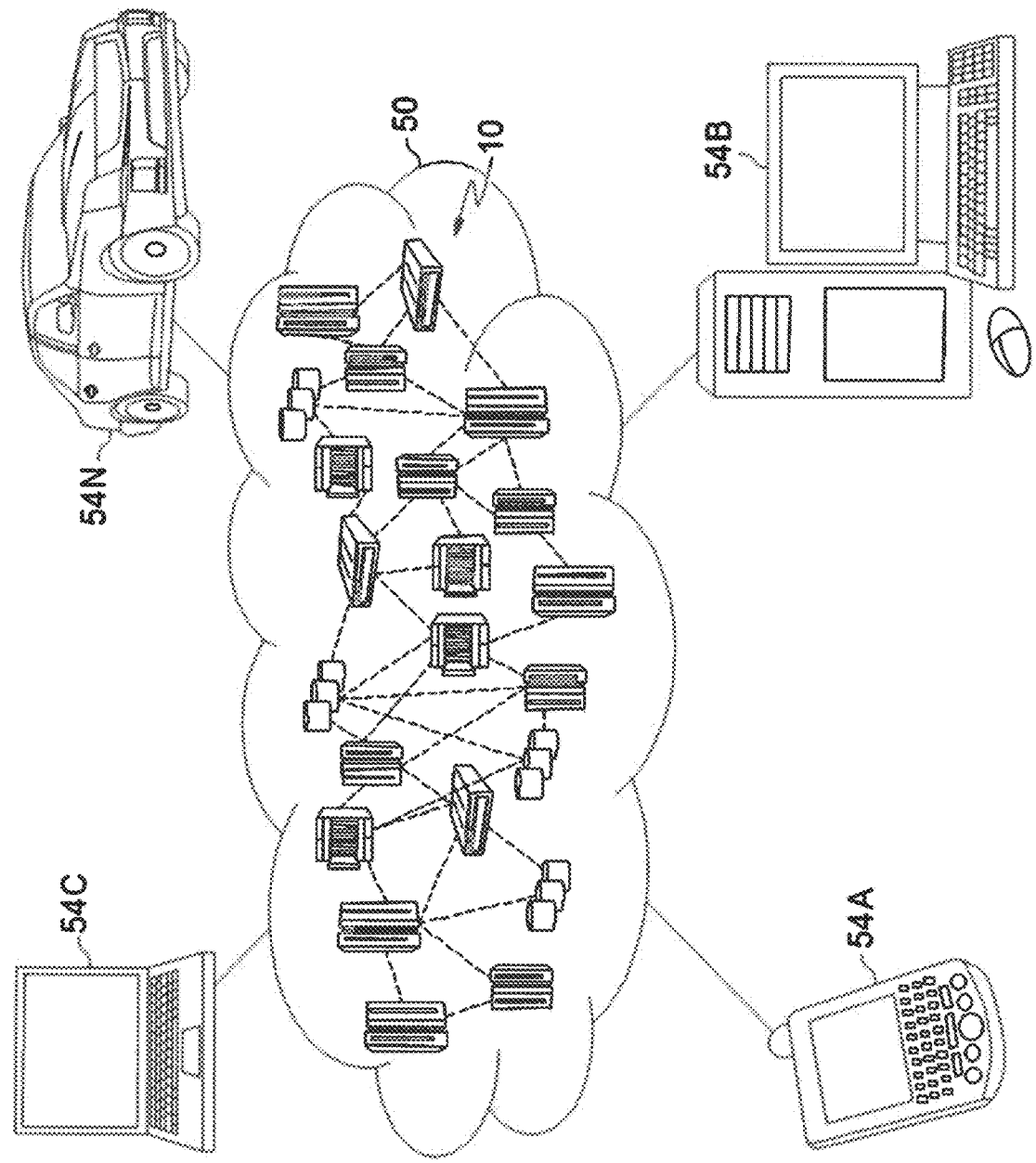
FIG. 8 depicts a cloud computing environment 50 according to an embodiment of the present invention.

Referring now to FIG. 8, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 9:
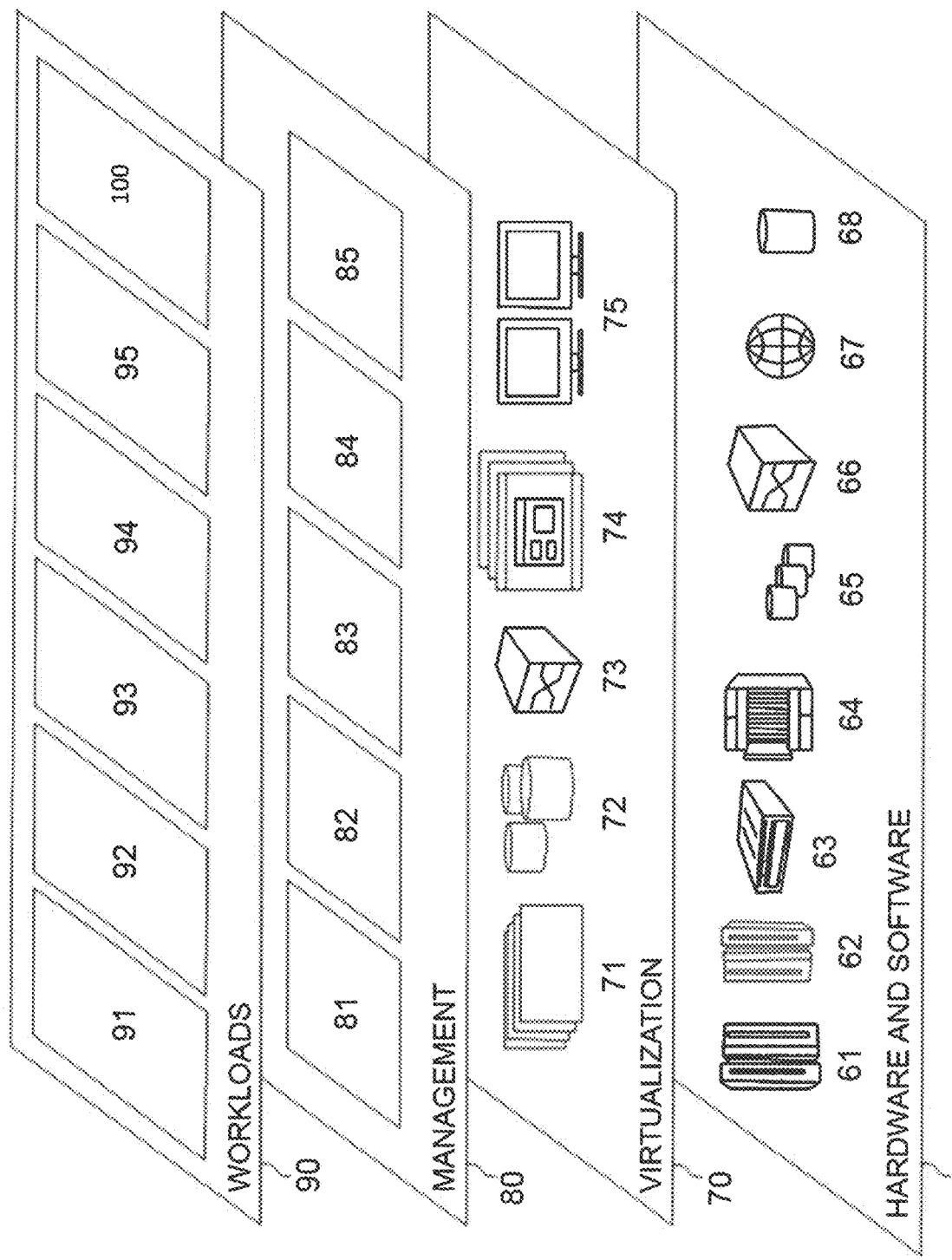
FIG. 9 depicts abstraction model layers according to an embodiment of the present invention.

Referring now to FIG. 9, an exemplary set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the social media control method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented social media control method, the method comprising:
    detecting a contextual meaning of a content of a third-party post on a user's social media account;
    classifying the content into user-defined categories based on an overlap between the contextual meaning and the user-defined categories;
    identifying an undesired piece of information from the content;
    identifying a trusted online friend within a social media circle of the user; and
    providing a one-time access control to the identified trusted online friend to rectify the undesired content in the third-party post,
    wherein the identifying identifies the undesired piece of information based on patterns of previous posts and comments posted by friends of the user along with a semantic understanding of the responses to the posted content and the associated metadata tagging based on an understanding of the user's activities stored in a database.

2. The computer-implemented method of claim 1, further comprising prompting a graphical user interface (GUI) to open on a device of the trusted online friend that includes the one-time access control to rectify the undesired content.

3. The computer-implemented method of claim 1, wherein the identifying the trusted online friend comprises identifying a type of a friend as the trusted online friend based on an analysis and a profiling of reactions, comments, and likes to historical posts.

4. The computer-implemented method of claim 1, wherein the providing the one-time access control to the identified trusted online friend is based on the user's relationship establishment with the social media circle of the user and responses to the user's previously posted content, the relationship establishment being fetched from an understanding of a level of engagement with the trusted online friend.

5. The computer-implemented method of claim 1, further comprising learning a reaction of the user and a response of the user to the undesired content and checking for an action taken by the user.

6. The computer-implemented method of claim 1, further comprising generating a report of the contextual meaning that triggers the providing, being used to inform the user, validate the providing, and collect additional training data for assessing user intent in posted content to identify undesirable content accurately.

7. The computer-implemented method of claim 1, wherein an option is provided to the user to one of to deny changes by the identified trusted online friend and to keep changes by the identified trusted online friend.

8. The computer-implemented method of claim 1, wherein the undesired content includes:
    a portion of text;
    a picture containing images of people other than those intended to be photographed;
    an audio recording having undesired sounds; and an audio recording having audio from people other than those for which the recording was intended.

9. The computer-implemented method of claim 1, embodied in a cloud-computing environment.

10. A computer program product for social media, the computer program product comprising a computer-readable storage medium having program instructions embodied therewith, the program instructions executable by a computer to cause the computer to perform:
   detecting a contextual meaning of a content of a third-party post on a user's social media account;
   classifying the content into user-defined categories based on an overlap between the contextual meaning and the user-defined categories;
   identifying an undesired piece of information from the content;
   identifying a trusted online friend within a social media circle of the user; and
   providing a one-time access control to the identified trusted online friend to rectify the undesired content in the third-party post,
   wherein the identifying identifies the undesired piece of information based on patterns of previous posts and comments posted by friends of the user along with a semantic understanding of the responses to the posted content and the associated metadata tagging based on an understanding of the user's activities stored in a database.

11. The computer program product of claim 10, further comprising prompting a graphical user interface (GUI) to open on a device of the trusted online friend that includes the one-time access control to rectify the undesired content.

12. The computer program product of claim 10, wherein the identifying the trusted online friend comprises identifying a type of a friend as the trusted online friend based on an analysis and a profiling of reactions, comments, and likes to historical posts.

13. The computer program product of claim 10, wherein the providing the one-time access control to the identified trusted online friend is based on the user's relationship establishment with the social media circle of the user and responses to the user's previously posted content, the relationship establishment being fetched from an understanding of a level of engagement with the trusted online friend.

14. The computer program product of claim 10, further comprising learning a reaction of the user and a response of the user to the undesired content and checking for an action taken by the user.

15. The computer program product of claim 10, further comprising generating a report of the contextual meaning that triggers the providing, being used to inform the user, validate the providing, and collect additional training data for assessing user intent in posted content to identify undesirable content accurately.

16. The computer program product of claim 10, wherein an option is provided to the user to one of to deny changes by the identified trusted online friend and to keep changes by the identified trusted online friend.

17. A social media system, said system comprising:
   a processor; and
   a memory, the memory storing instructions to cause the processor to perform:
      detecting a contextual meaning of a content of a third-party post on a user's social media account;
      classifying the content into user-defined categories based on an overlap between the contextual meaning and the user-defined categories;
      identifying an undesired piece of information from the content;
      identifying a trusted online friend within a social media circle of the user; and
      providing a one-time access control to the identified trusted online friend to rectify the undesired content in the third-party post,
   wherein the identifying identifies the undesired piece of information based on patterns of previous posts and comments posted by friends of the user along with a semantic understanding of the responses to the posted content and the associated metadata tagging based on an understanding of the user's activities stored in a database.

18. The system of claim 17, embodied in a cloud-computing environment.

* * * * *